March 19, 1974     R. L. HAWLEY     3,798,336
METHOD FOR CENTERING SOLID BODIES WITHIN A COAGULABLE LIQUID
Filed March 15, 1971
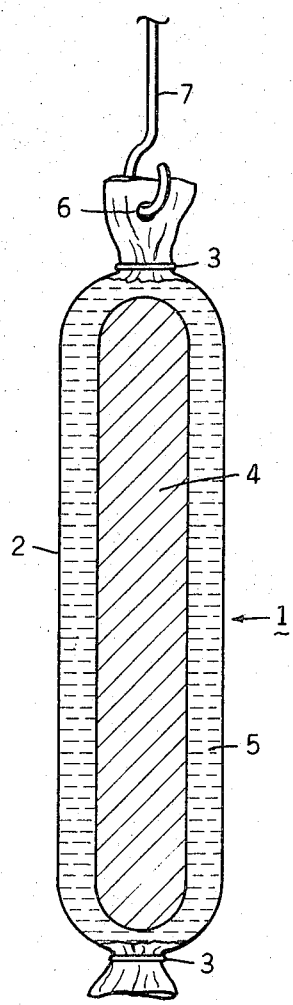
INVENTOR
ROBERT LYLE HAWLEY
BY
*Lawrence J. Horst*
ATTORNEY

United States Patent Office 3,798,336
Patented Mar. 19, 1974

3,798,336
METHOD FOR CENTERING SOLID BODIES WITHIN A COAGULABLE LIQUID
Robert Lyle Hawley, Webster Groves, Mo., assignor to Ralston Purina Company, St. Louis, Mo.
Filed Mar. 15, 1971, Ser. No. 124,054
Int. Cl. A23l 1/32
U.S. Cl. 426—279
11 Claims

ABSTRACT OF THE DISCLOSURE

A container having a discrete body and liquid coagulable material therein is subjected to cyclical or vibratory motion while being heated whereby the discrete body floats within the coagulable material as it is coagulated substantially concentrically about the discrete body.

BACKGROUND OF THE INVENTION

This invention relates to a method of manufacturing a product whereby a discrete body may be substantially concentrically surrounded or encased by a coagulated material in a continuous manner. More particularly, the present invention relates to a method of manufacturing a cooked egg roll product with the yolk centered therein.

In the manufacture of an egg roll product it is desirable to have the yolk portion centered in the albumen portion. In the past, one of the methods utilized to achieve this finalized product in its desired form required that the yolk portion be fixedly positioned before the albumen portion was formed around the yolk portion. This fixed positioning of the yolk required the holding of the yolk portion in the center of a casing by means of pins. This casing would later be filled with albumen which was coagulated and cooked about the yolk. This pinning operation to insure that the yolk portion was centralized was undesirable since it required an additional manual operation which increased the cost of producing such an egg product. Another of the prior art attempts to insure that the yolk portion would be centralized in the albumen required the use of an interior sleeve or mold. The liquid albumen would be coagulated into its desired shape and then the interior mold would be removed and the liquid yolk would be supplied to the interior area. However, this was undesirable since it required the burden of removing the interior mold before the yolk portion could be placed in the egg roll. It was also undesirable because the albumen portion was subjected to an additional heating or cooking operation to coagulate the yolk portion which was placed in the interior of the previously coagulated albumen portion.

Still other prior art attempts to centralize the yolk within an egg roll have required that the yolk be extruded concentrically within the extrusion of the albumen or that the roll be rotated about its main axis which is maintained horizontal during the coagulation. Both of these methods of centering the yolk within the albumen required elaborate machinery.

In accordance with this invention, it is possible to overcome these manual operations and still insure that the yolk portion of the egg roll will be centralized in the albumen. In addition, the method disclosed herein may be performed without the necessity of using elaborate or expensive machinery. Further, the present invention permits the continuous production of products of this type in a simplified manner. This invention makes it possible to achieve this desired result by subjecting a container having a yolk body and liquid albumen therein to a cyclical or vibratory motion as the albumen is being coagulated which serves to permit the coagulation of the albumen about the yolk portion.

SUMMARY OF THE INVENTION

It is, therefore, the general object of the present invention to provide a method for producing a product which includes a simplified manner of centralizing an inner discrete portion within the outer coagulable portion of the product.

Another object of the present invention is to provide a method having a single operation for substantially centralizing the yolk portion of an egg roll within the albumen while cooking the egg roll.

Briefly, the present invention comprises the method of producing a product having the steps of placing an inner body and liquid coagulable material into a container, and heating and oscillating said container so that coagulable material coagulates substantially concentrically in the container about the inner body.

These and other objects and advantages will become apparent hereinafter. It should be understood that although the present invention may be utilized for centering other discrete inner bodies within a coagulable material, such as surrounding a sausage stick with gelatin or fat, the preferred embodiment of the invention is for the centering of yolk bodies within the albumen of egg rolls and for ease of understanding the present invention will be described in terms of preparing an egg roll product, however the subject invention should not be so limited.

BRIEF DESCRIPTION OF THE DRAWING

In the drawing which illustrates an embodiment of the present invention is shown an enlarged cross-sectional view of the liquid albumen and yolk body in the container following the cooking operation.

DESCRIPTION OF THE PREFERRED EMBODIMENTS

Referring now to the figure, an egg roll product, indicated generally at 1, is provided in a container or casing 2 which may be closed at the ends by suitable means such as retainer wires 3. Conveniently, the casing 2 will be a standard sausage casing made of regenerated cellulose coated with saran or other suitable material. One of the retainer wires 3 is affixed to the container 2 and thereafter a discrete body 4, such as a coagulated egg yolk body, is loosely or randomly placed in the casing or container 2. The yolk body may be formed by crystallized yolk, i.e., yolks which have been cooked in their own membranes, and then compressed together by extrusion or may be formed of non-crystallized yolks, i.e., yolks which have been cooked out of their natural membrane, comminuted to eliminate the gel formation therein and then compressed together and cooked. Both of these methods of forming a solid egg yolk body having a crumbly texture are well-known in the art. It should be realized that, if desired, other methods may be utilized in preparing the solid egg yolk body. The container 2 is then filled with liquid heat coagulable albumen, such as egg albumen 5, or egg albumen prepared in accordance with the disclosure in my Pat. 3,510,315 issued May 5, 1970, or the albumen may be prepared in accordance with the desired manners of treating egg albumen for use in such products. Alternatively, the albumen 5 may initially be placed within the container 2 and the yolk body 4 then inserted into the casing. The other retainer wire 3 is then secured at the other end of the casing to confine the solid yolk body 4 and liquid albumen 5 therein. Since the yolk body 4 was merely randomly placed within the container 2, if the container 2 were heated to coagulate the albumen at this point, the yolk body would not be surrounded by albumen and an appealing product would not be produced. The casing 2, egg yolk body 4, and liquid egg albumen 5 forms a unit which may be processed by the present invention. It should be noted that at least one of the ends of the casing 2 is provided with an opening or hole 6 therein which is outwardly of the retainer 3. Conveniently, a retainer clip 3 may be used having the hole provided therein.

In practicing the present invention, the casing 2 is subjected to sufficient cyclical or vibratory movement or motion to establish a relative motion between the yolk body 4 and the liquid albumen 5 within the casing 2 so as to allow the yolk body 4 to oscillate or float within the liquid albumen. Simultaneously, with the establishment of the vibratory movement or motion, the casing 2 is subjected to heat such as by placement into a heated liquid bath to permit coagulation of the albumen as the yolk body 4 floats therein. Since the heating media effects coagulation of the albumen from the outward portion thereof inwardly in a substantially concentric pattern, the yolk body 4, due to the floating action, is forced to the center thereof so as to establish the coagulation of the albumen substantially concentrically about the yolk body. Many forms of cyclical movement or motion may be utilized to obtain the oscillation or relative movement of the yolk body within the liquid albumen. Preferably, the casing 2 is hung or suspended by means of a hanger or hook 7 in the hole 6 such that the major axis of the casing 2 is substantially in a vertical plane. Conveniently, the hook 7 may be on a conveyor. The suspended casing is then cyclically or intermittently moved with sufficient velocity to establish the relative or floating movement of the yolk body 4 within the casing 2. It should be understood that this intermittent or vibratory motion should not be of such force or magnitude to destroy or break-up the coagulated yolk body 4. Further, the desired vibratory movement and centering of the yolk may be obtained by maintaining the suspended end stationary while subjecting the free end to a pendulum type of movement or by moving the suspended end in an intermittent translatory motion which will establish at the free end an oscillatory or pendulum type movement relative to the suspended end. It has been found that sufficient relative movement is generated between the yolk body and the liquid albumen when an amplitude of movement of only one-quarter inch is established at the free end of a suspended egg roll casing. The method has been satisfactorily carried out when the amplitude at the free end was in the range of ¼ inch to about 5 inches. However, it should be realized that depending on the size of the egg roll being processed and the technique utilized, other oscillatory or vibrating movements having different amplitudes could be utilized, with the essential characteristic being that sufficient relative or floating movement of the yolk body be established to permit coagulation of the albumen about the yolk body. The desired floating action of the yolk body relative to the albumen may be obtained by other cyclical nonuniform translatory movement. Cyclical movement as used herein is intended to cover movements other than continuous uniform motion of the container in a specific direction or rotational movement of the container.

As a further alternative, the casing 2 could be provided with retainers 3 having holes 6 therein at each end enabling the casing to be fixed or held at each end thereof by brackets and subjected to an intermittent translatory movement which would be cyclical and sufficient to establish the vibratory or relative motion between the yolk body and liquid albumen.

Preferably, the coagulation of the albumen is effected by immersing the casing 2 within a heated liquid bath having a temperature of approximately 160°–210° F. The cyclical movement or vibratory motion to which the container is subjected should be performed during the heating step and the heating step should be for a sufficient time to effect the coagulation of the albumen 5 about the yolk body 4. For an egg roll having an outer diameter of approximately 1¾ inches and a yolk diameter of approximately 1 inch, the cyclical movement or vibratory motion while heating in the above temperature range should last for approximately 1–6 minutes in order to obtain the surrounding of the yolk body 4 with the coagulated albumen. Preferably, such an egg roll will be subjected to the cyclical movement for approximately 1½ minutes in a heated liquid bath having a temperature of approximately 190°–200° F. to obtain the desired degree of coagulation of the albumen and centering of the yolk body therein. In order to effect the complete cooking of the albumen, it is preferable that a heating take place for a period of approximately 15–25 minutes at the above stated temperature; however, this additional heating step does not necessarily have to be performed during the cyclical or vibratory movement of the egg roll since the egg roll can be cooked during either the vibratory movement or in a static condition after the initial coagulation of the albumen substantially concentrically about the yolk body. If desired, other means of heating the casing 2 to coagulate the albumen 5 therein could be utilized during the cyclical or vibratory movement of the casing such as steam heat. The time of cooking and the temperature of the egg roll should be carefully regulated to avoid a green discoloration appearing at the interface between the egg yolk body and albumen. The longer the egg roll is heated after the albumen is substantially coagulated the greater the incidence of green discoloration might be. The temperature of the albumen should be in the range of 148° F. to 200° F. on completion of the heating step and preferably the temperature is between 160° F. and 180° F. It should be realized that alternatively, if desired, the coagulation of the albumen about the yolk body may be effected by freezing rather than by heating.

From the foregoing, it is now apparent that a novel process for substantially centralizing a discrete body within a coagulable material and more particularly, a continuous process for substantially centralizing the yolk body in the albumen portion of an egg roll product meeting the objectives set out hereinbefore has been disclosed and that changes or modifications as to the process set forth in the disclosure by way of illustration may be made by those skilled in the art without departing from the spirit of the invention as defined by the claims which follow.

What is claimed is:

1. A method of centralizing a solid discrete body substantially concentrically within a coagulable material wherein the discrete body and liquid coagulable material are in a container comprising the steps of: suspending said container in a substantially vertical position, heating said container to coagulate the coagulable material therein and subjecting said container to cyclical movement with sufficient force to establish a floating action of the discrete body within the coagulable material as it is heated to coagulate the material substantially concentrically about the discrete body.

2. A method of centralizing the yolk body in the albumen portion of an egg roll product comprising the steps of: placing a yolk body into a container, filling said container with liquid heat coagulable albumen, suspending said container at one end thereof, heating said container to coagulate the albumen therein, and subjecting said container to cyclical movement with sufficient force to establish a floating action of the yolk body within the albumen as it is heated to coagulate the albumen substantially concentrically about the yolk body.

3. The method according to claim 2 wherein said cyclical movement step comprises reciprocally moving said container at the suspended end thereof while the other end is maintained free.

4. The method according to claim 3 wherein the amplitude of reciprocal movement of the free end of said container is approximately ¼" to 5".

5. The method according to claim 2 wherein said heating step is performed by retaining said container in a heated liquid bath for a sufficient period of time to effect coagulation of the albumen.

6. The method according to claim 5 wherein the albumen is heated in a bath having a temperature of approximately 160° F. to 210° F. for approximately 15–25 minutes to completely cook the egg roll.

7. The method according to claim 5 wherein the albumen is heated in a bath having a temperature of approximately 160° F.–210° F. for approximately 1–6 minutes to coagulate the albumen about the yolk body.

8. The method according to claim 7 wherein the heating is to a temperature of approximately 190° F.–200° F. for approximately 1½ minutes.

9. A method of centralizing the yolk body in the albumen portion of an egg roll product comprising the steps of: placing a yolk body and liquid heat coagulable albumen into a container, suspending said container at one end thereof so that its major axis is substantially in a vertical plane, coagulating the albumen in said container and subjecting said container to sufficient cyclical movement during the coagulation of the albumen to permit the albumen to coagulate substantially concentrically about the yoke body.

10. The method according to claim 9 wherein the cyclical movement consists of intermittingly moving the suspended end of said container along a predetermined path.

11. The method according to claim 9 including holding the other end of said container and wherein the cyclical movement consists of subjecting said container to intermittent translatory motion.

References Cited

UNITED STATES PATENTS 3,493,393   2/1970   Shires _____ 99—113

RAYMOND N. JONES, Primary Examiner

U.S. Cl. X.R.

99—107, 109; 426—512, 523